United States Patent
Richards

[15] 3,662,737
[45] May 16, 1972

[54] CATALYTIC HEATER

[72] Inventor: Joe M. Richards, Tulsa, Okla.

[73] Assignee: Nupar Manufacturing Co., Inc., Tulsa, Okla.

[22] Filed: June 29, 1970

[21] Appl. No.: 50,557

[52] U.S. Cl. ..............................126/92 R, 431/77, 431/329
[51] Int. Cl. .........................................................F24c 3/04
[58] Field of Search ................126/85, 91, 92, 92 B; 431/77, 431/328, 329

[56] References Cited

UNITED STATES PATENTS

| | | | |
|---|---|---|---|
| 3,200,809 | 8/1965 | Suchowolec | 126/92 B |
| 3,037,554 | 6/1962 | Risse | 431/77 |
| 3,202,205 | 8/1965 | Webster | 126/92 X |
| 3,498,732 | 3/1970 | Schantz | 126/92 X |

FOREIGN PATENTS OR APPLICATIONS 1,136,829   1/1957   France....................................431/329

Primary Examiner—Charles J. Myhre
Attorney—Head & Johnson

[57] ABSTRACT

A catalytic heater having a catalytic bed connected to a frame, incorporates an improved ignition and fuel shutoff system. A needle valve controlling the discharge of fuel onto the catalytic bed for oxidation includes a thermosensitive needle which is preheated by a pilot light. Upon reaching a predetermined temperature, the thermosensitive needle disengages its valve seat to allow fuel from the fuel supply to discharge onto the catalytic bed where oxidation thereof occurs. Upon cooling of the catalytic bed the thermosensitive needle resets to abrogate the discharge of fuel onto the catalytic bed and thereby prevent leakage of fuel.

4 Claims, 2 Drawing Figures

PATENTED MAY 16 1972 3,662,737

INVENTOR.
JOE M. RICHARDS
BY
*Head & Johnson*
ATTORNEYS

INVENTOR.
JOE M. RICHARDS

CATALYTIC HEATER

BACKGROUND OF THE INVENTION

This invention relates to heaters and more particularly to a catalytic heater having an improved ignition and fuel shutoff system.

Presently manufactured catalytic heaters usually consist of a catalytic bed or burner and a source of fuel such as hydrocarbons. The catalytic bed comprises a non-combustible supporting material which is saturated with a catalytic agent. The catalytic agent reduces the oxidation temperature of the fuel to a valve below the flaming point, such that flameless radiant heat is produced when fuel is discharged onto the catalytic bed.

Presently manufactured catalytic heaters have two main disadvantages. First, the preheating of the bed to reaction temperature, that is the temperature at which the fuel oxidizes without flame, must be done by sprinkling the catalytic bed with an external fuel and lighting the same. This results in a flaming up of the catalytic bed momentarily until the bed reaches reaction temperature. Secondly, presently manufactured catalytic heaters do not have any safety shutoff of the fuel supply in the event of inadvertent reduction of the catalytic bed temperature to a valve below the reaction temperature.

It is therefore an object of this invention to present a catalytic heater having overcome the aforementioned difficulties of presently manufactured catalytic heaters.

It is a further object of this invention to present a catalytic heater having an improved ignition system wherein the catalytic bed is preheated before introduction of the hydrocarbon fuel onto the bed.

It is still a further object of this invention to present a catalytic heater incorporating an automatic fuel shutoff apparatus.

It is still a further object of this invention to present a catalytic heater pivotally carried by a frame and having storage space for spare fuel reservoirs.

SUMMARY OF THE INVENTION

Generally the catalytic heater of this invention comprises a frame having pivotally connected thereto a catalytic bed carrying a catalyst of platinum. The catalytic bed is interconnected to a hydrocarbon fuel supply which discharges the fuel upon the catalytic bed for non-flammable oxidation thereof. An ignition and fuel shutoff system inserted between the fuel supply and the catalytic bed includes a needle valve which is controlled by a thermosensitive bi-metallic element which in turn controls and regulates the flow of fuel onto the catalytic bed.

DETAILED DESCRIPTION OF THE PREFERRED EMBODIMENT

Figure 1:
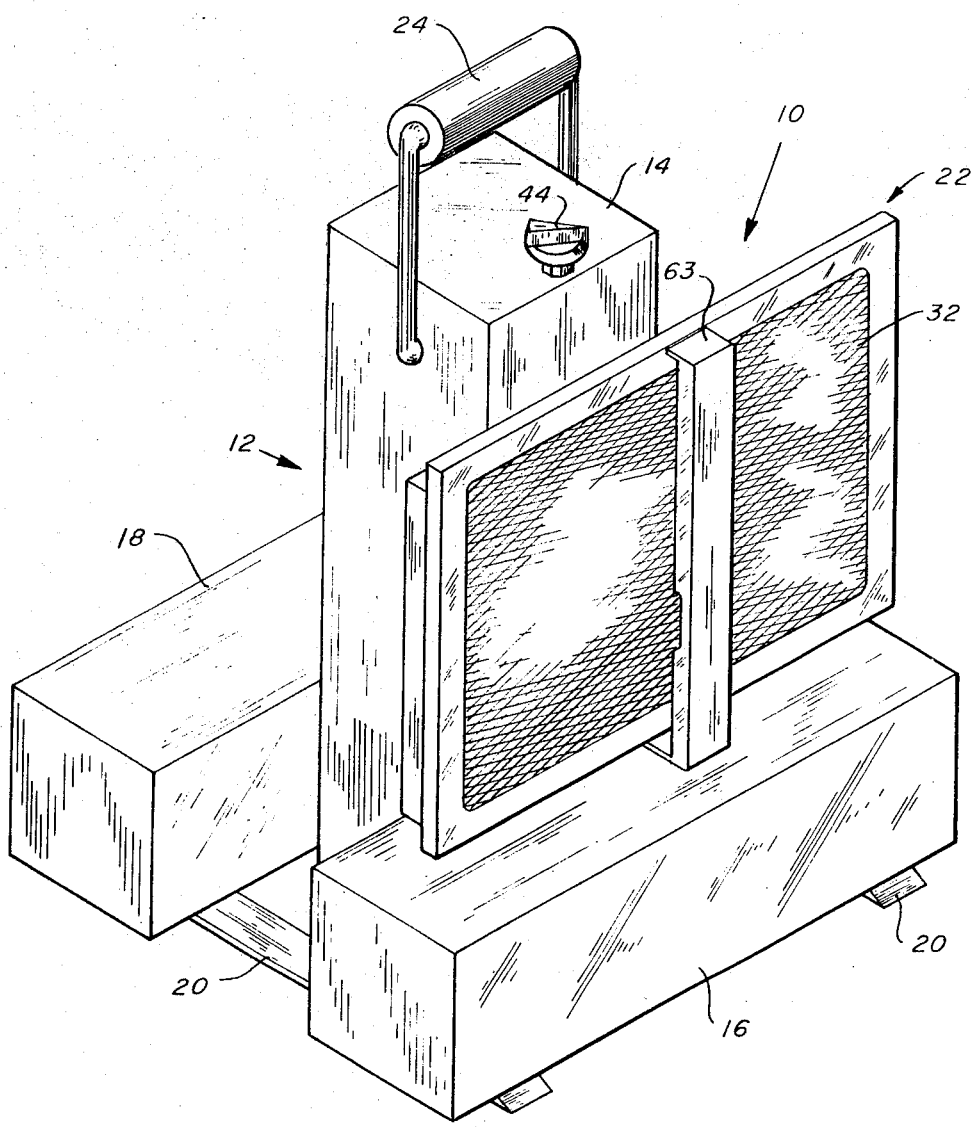
FIG. 1 is an isometric view showing the catalytic heater of this invention.

Turning now to FIG. 1, there is shown an isometric view of one embodiment of the improved catalytic heater of this invention. The detailed description of the improved catalytic heater will refer specifically to a portable heater for use in heating tents, duck blinds, garages, campers or other relatively small areas. However, it is to be understood that the principles discussed in the preferred embodiment can just as easily find application in larger catalytic heaters such as those used for industrial purposes.

The catalytic heater generally noted as the numeral 10 includes a frame 12 having a hollow upstanding member 14 bordered at the lower end thereof by hollow horizontal members 16 and 18. Suitable legs 20 are provided on the underside of frame members 16 and 18. Pivotally connected to upstanding frame member 14 is a catalytic burner or bed assembly 22 wherein fuel oxidation to produce heat occurs. A carrying handle 24 hinged to upstanding frame member 14 possesses a positive stop which prevents the handle from falling on or resting in front of the catalytic burner 22, thereby assuring a cool handle at all times. Consequently the heater can be carried or repositioned at any time.

Figure 2:
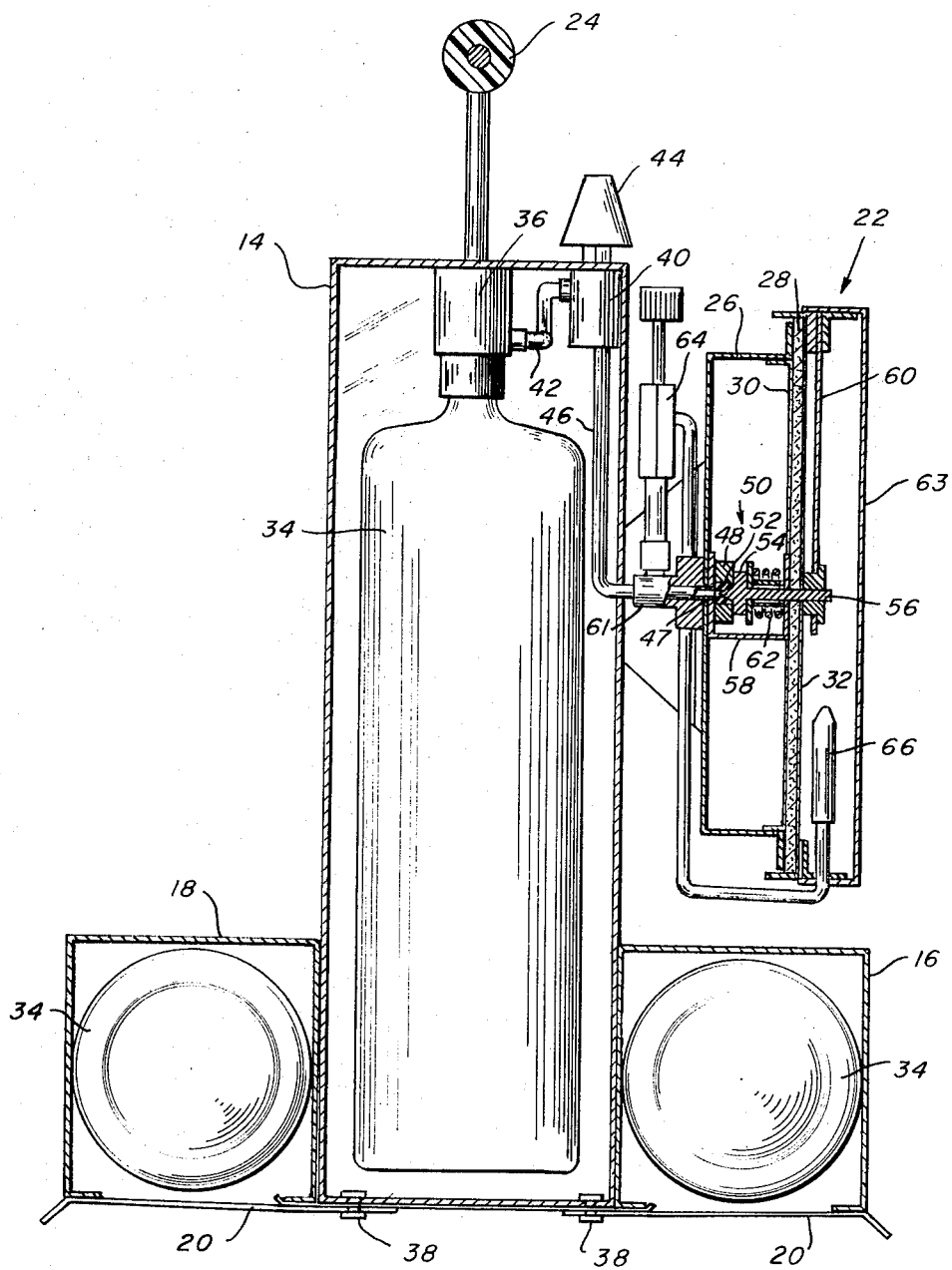
FIG. 2 is a cross-sectional view of the catalytic heater of this invention taken along lines 2—2 of FIG. 1.

Referring now to the partial cross-sectional side view of FIG. 2, and in particular to catalytic bed or burner assembly 22, a support-material retainer member 26 is pivotally connected to upstanding frame member 14 and is bounded by a peripheral flange surface which receives and holds a planar non-combustible supporting material 28 forming a catalytic bed sandwiched between wire mesh 30 at the rearward surface of the catalytic bed and wire mesh 32 at the forward surface of the catalytic bed. Non-combustible supporting material may be of such materials as asbestos, silica gel or alumina and is saturated with a catalytic agent, such as platinum. A catalytic agent is a substance which alters the rate of chemical reaction between two bodies and is itself unchanged at the end of the reaction. For example in the instant application, the platinum will alter the chemical reaction rate of hydrocarbon fuel and oxygen such that heat-producing oxidation will occur at a temperature of approximately 800° F. which is below the flaming point of the fuel. Consequently catalytic heaters are used where fire hazards must be minimized.

Received in upstanding frame member 14 is a commercially available pressurized cylinder 34 of hydrocarbon fuel such as propane. Fuel cylinder 34 is inserted through an aperture in the bottom of upstanding frame member 14 and has a threaded neck which is screwed directly into the receptacle of a pressure regulator 36 secured to the upper end of frame member 14. The receptacle of the regulator contains means for puncturing cylinder 34 when such is received therein.

Spare fuel cylinders 34 are received in horizontal frame members 16 and 18 and serve to make the heater tip-resistant. Legs 20 are pivotal as at 38 to allow easy insertion and removal of the spare cylinders.

Pressure regulator 36 includes an outlet which feeds the inlet of a manually controlled metering valve 40 through suitable tubing 42. A knob 44 projecting exteriorly of upstanding frame member 14 facilitates the opening and closing of metering valve 40.

The outlet port of metering valve 40 is fluidly connected through tubing 46 to the inlet of a safety needle valve 48 which is centrally secured to the back of retainer member 26 and which has the outlet thereof positioned so as to discharge fuel, when opened, onto supporting material 28.

The opening and closing of valve 48 is controlled by the sliding movement of valve needle 50 having a conical tip 52 engageable in a pliant valve seat 47 in the outlet port of valve 48. Needle 50 further includes an enlarged head portion 54 adapted to sprinkle fuel onto supporting material 28 and a forwardly projecting stem 56 which passes through an aperture in an aligning bracket 58 and terminates exteriorly of supporting material 28. The forward end of stem 56 is interconnected to the lower end of a thermosensitive bi-metallic strip 60 having the upper end thereof rigidly interconnected to retainer member 26.

Needle 50 is biased toward valve seat 47 by means of a spring 62 sleeved over needle stem 56 and interposed between the needle head 54 and the forward leg of aligning bracket 58. Thus needle 50 will normally engage valve seat 47 to shut off fuel flow; however upon heating, thermosensitive bi-metallic strip 60 overcomes the biasment of spring 62 to disengage the needle from the valve seat to allow fuel to saturate supporting material 28 whereat the reaction temperature heat-producing oxidation occurs.

Needle valve 40, needle 50 and bi-metallic strip 60 so disposed on catalytic burner assembly provide for positive automatic fuel shutoff in the event that during operation the catalytic bed temperature drops below the value necessary for oxidation.

In addition to automatic fuel shutoff means, the catalytic heater of this invention also incorporates an ignition or pilot light apparatus for preheating the catalytic bed 22 and bi-metallic strip 60 to reaction temperature without requiring the aforementioned step of sprinkling fuel on the bed. The ignition or pilot light apparatus includes a normally closed push button actuated valve 64 having an inlet port fluidly connected to the outlet port of metering valve 40 and having an outlet port feeding through suitable tubing a pilot light nozzle 66. A commercially available T-fitting 61 is one means of achieving the parallel connection of push button valve 64 and needle valve 48 to the outlet port of metering valve 40. Nozzle 66 is disposed outwardly of supporting material 28 and is positioned such that a flame emanating therefrom will simultaneously heat the catalytic supporting material 28 and bi-metallic strip 60. Push button valve 64 is to be located in a position which is easily accessible to the operator of the heater.

Turning now to the operation of the catalytic heater of this invention, the heater is for operation that is lighted in the following manner. Metering valve 40 is opened by the use of knob 44 to allow gas to enter tubing 46. Next the pilot light push button valve 64 is actuated, that is, such is opened to allow gas to flow to nozzle 66 where an external flame source, such as a match, is used to light the pilot light.

The flame emanating from the nozzle 64 simultaneously elevates the temperature of the catalytic bed and bi-metallic strip 62. As the temperature of the bi-metallic strip and the catalytic bed increases, valve needle 50 disengages to allow fuel to be admitted onto the support material 28 impregnated with the catalytic agent. At this point pilot light valve 64 can be deactivated.

Initially fuel oxidizing on the catalytic burner will burn with a relatively small visible flame; however, after a short time, such as 30 to 45 seconds, as the reaction temperature of the catalytic bed is elevated, the flame goes out and the oxidation proceeds without flame as fuel continues to be sprayed upon support material and to produce flameless heat.

In the detailed description of the preferred embodiments specific language has been used for the sake of clarity. However, it is to be understood that such language is used for the sake of clarity only, and does not limit the invention in any manner.

What is claimed is:

1. A catalytic heater for producing flameless heat including safety shut-off means, comprising:
    a fuel supply;
    a planar catalytic bed having a non-combustible support carrier and a catalytic agent thereon, the catalytic bed having a forward and a rearward surface and having a small diameter opening therein;
    a valve having an inlet port fluidly interconnected to said fuel supply and to an outlet port;
    a needle valve having an inlet port fluidly communicating with the outlet port of said metering valve and an outlet port adapted to discharge fuel on to said catalytic bed rearward surface;
    a valve needle slidably received in said opening in said catalytic bed and seatable in the outlet port of said needle valve;
    spring means normally urging said needle valve to the closed position; and
    a thermosensitive element supported adjacent the catalytic bed forward surface and interconnected to said valve needle, said thermosensitive element being positioned so as to be responsive to heat radiating from said catalytic bed forward surface whereby upon heat radiating from said bed forward surface said thermosensitive element disengages said valve needle from said outlet port of said valve, and in the absence of said heat, said spring moves said valve needle to seat in said needle valve to shut off fuel flow therethrough.

2. A catalytic heater as in claim 1 including a frame member supporting said catalytic bed, said frame including an upstanding portion bordered at the lower end thereof by horizontal members, said upstanding portion adaptable to carry said fuel supply in the form of a pressurized reservoir, and including horizontal members containing therein at least one spare fuel reservoir said spare reservoir serving as a stabilizer to reduce the possibility of tippage of said heater.

3. An apparatus as in claim 1 including an ignition means for preheating said catalytic bed and thermosensitive element whereby said valve needle disengages said valve outlet port to permit discharging of fuel onto said catalytic bed for oxidation.

4. An apparatus as in claim 3 wherein said ignition means comprises:
    a pilot valve having an inlet port fluidly interconnected to said fuel supply and an outlet port; and
    a pilot nozzle fluidly communicating with said pilot valve and positioned adjacent said catalytic bed forward surface and said thermosensitive element.

* * * * *